US009092076B2

United States Patent
Branca, Jr.

(10) Patent No.: US 9,092,076 B2
(45) Date of Patent: Jul. 28, 2015

(54) ELECTRONIC TRANSACTION CARD WITH STYLUS

(71) Applicant: MasterCard International Incorporated, Purchase, NY (US)

(72) Inventor: Frederick F. Branca, Jr., Patterson, NY (US)

(73) Assignee: MasterCard International Incorporated, Purchase, NY (US)

( * ) Notice: Subject to any disclaimer, the term of this patent is extended or adjusted under 35 U.S.C. 154(b) by 23 days.

(21) Appl. No.: 13/755,997

(22) Filed: Jan. 31, 2013

(65) Prior Publication Data

US 2014/0209688 A1 Jul. 31, 2014

(51) Int. Cl.
*G06K 19/06* (2006.01)
*G06F 3/0354* (2013.01)
*G06K 19/077* (2006.01)
*G06F 1/16* (2006.01)
*G06K 9/22* (2006.01)

(52) U.S. Cl.
CPC .......... *G06F 3/03545* (2013.01); *G06F 1/1679* (2013.01); *G06K 9/22* (2013.01); *G06K 19/07737* (2013.01)

(58) Field of Classification Search
CPC ................ G06F 2200/1632; G06F 3/03545; G06F 1/1679; B43K 23/0001; B43K 31/00
USPC ....................................................... 235/492
See application file for complete search history.

(56) References Cited

U.S. PATENT DOCUMENTS

| | | | | |
|---|---|---|---|---|
| 3,434,414 | A * | 3/1969 | Wright | 283/98 |
| 5,328,026 | A * | 7/1994 | Newman | 206/234 |
| 5,678,939 | A * | 10/1997 | Ross | 401/6 |
| 6,044,967 | A * | 4/2000 | Painsith | 206/234 |
| 6,145,994 | A * | 11/2000 | Ng | 362/119 |
| 6,392,639 | B1 * | 5/2002 | Lee et al. | 345/179 |
| 6,571,940 | B2 * | 6/2003 | Newman | 206/38 |
| 7,296,944 | B2 * | 11/2007 | Steinschaden | 401/209 |
| 2004/0126284 | A1 * | 7/2004 | Lilly et al. | 422/119 |
| 2006/0250485 | A1 * | 11/2006 | Silverbrook et al. | 347/109 |
| 2010/0063893 | A1 * | 3/2010 | Townsend | 705/26 |

* cited by examiner

*Primary Examiner* — Christopher Stanford
*Assistant Examiner* — Asifa Habib
(74) *Attorney, Agent, or Firm* — Leason Ellis LLP

(57) ABSTRACT

An electronic transaction card for completing an electronic transaction is provided, the transaction card includes an integrated stylus can be used to interact with a touchscreen. In one embodiment a transaction card is provided that is substantially rectangular and at least one of the corners has a shape that defines a stylus tip and differs from at least one or more of the other corners of the card. In another embodiment a transaction card is provided with an extendible stylus. Thus, the card can include a mount that supports a stylus that is movable between a stored position, in which the stylus tip does not protrude beyond the perimeter of the card, and an extended position, in which the stylus tip extends beyond the perimeter of the card.

6 Claims, 5 Drawing Sheets

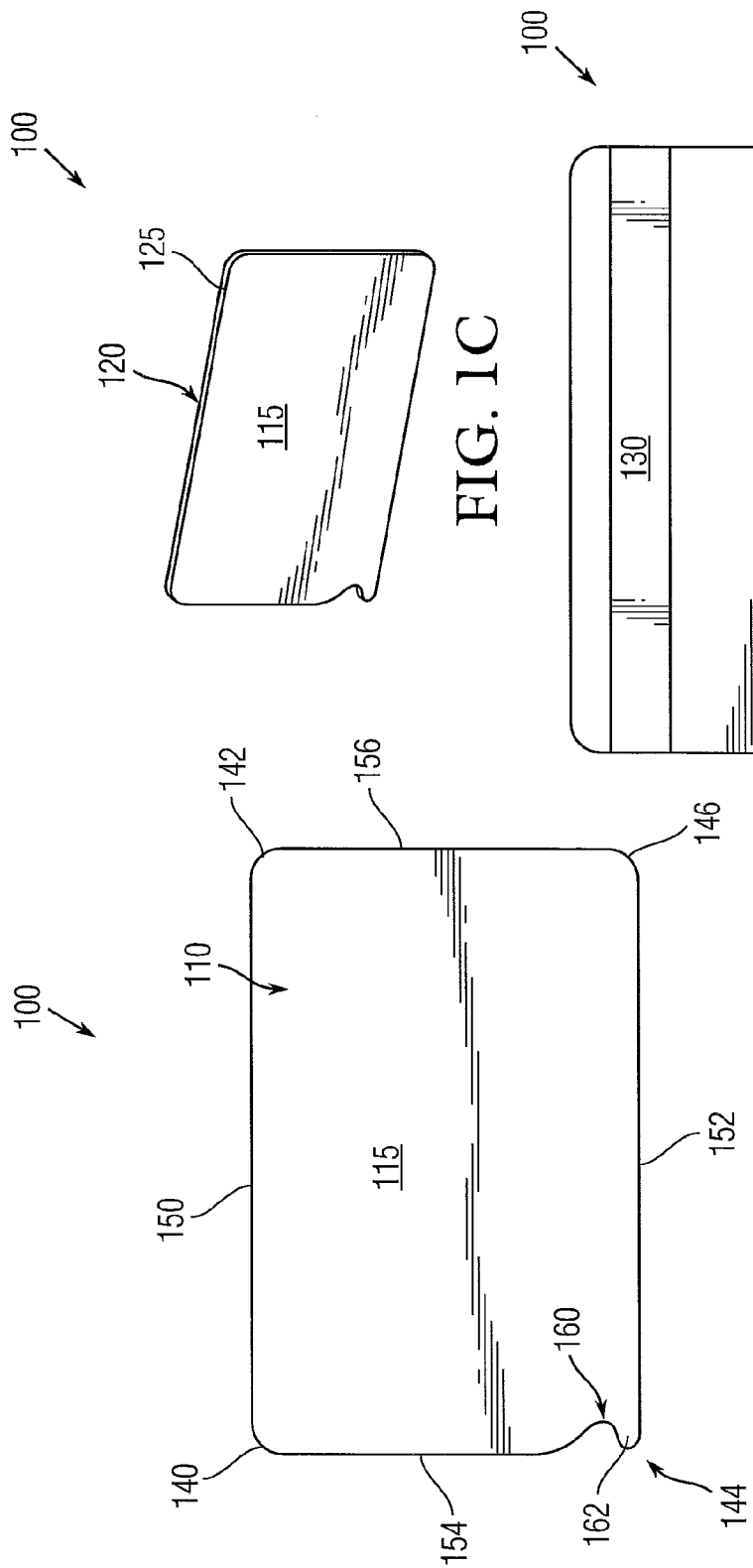
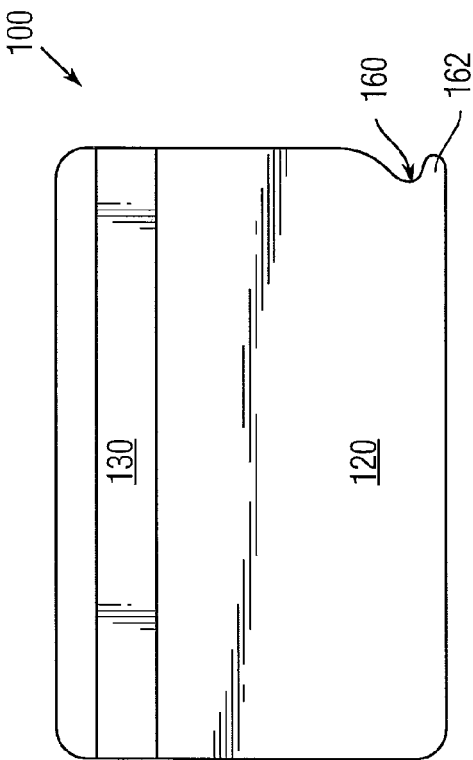
FIG. 1C
FIG. 1B
FIG. 1A

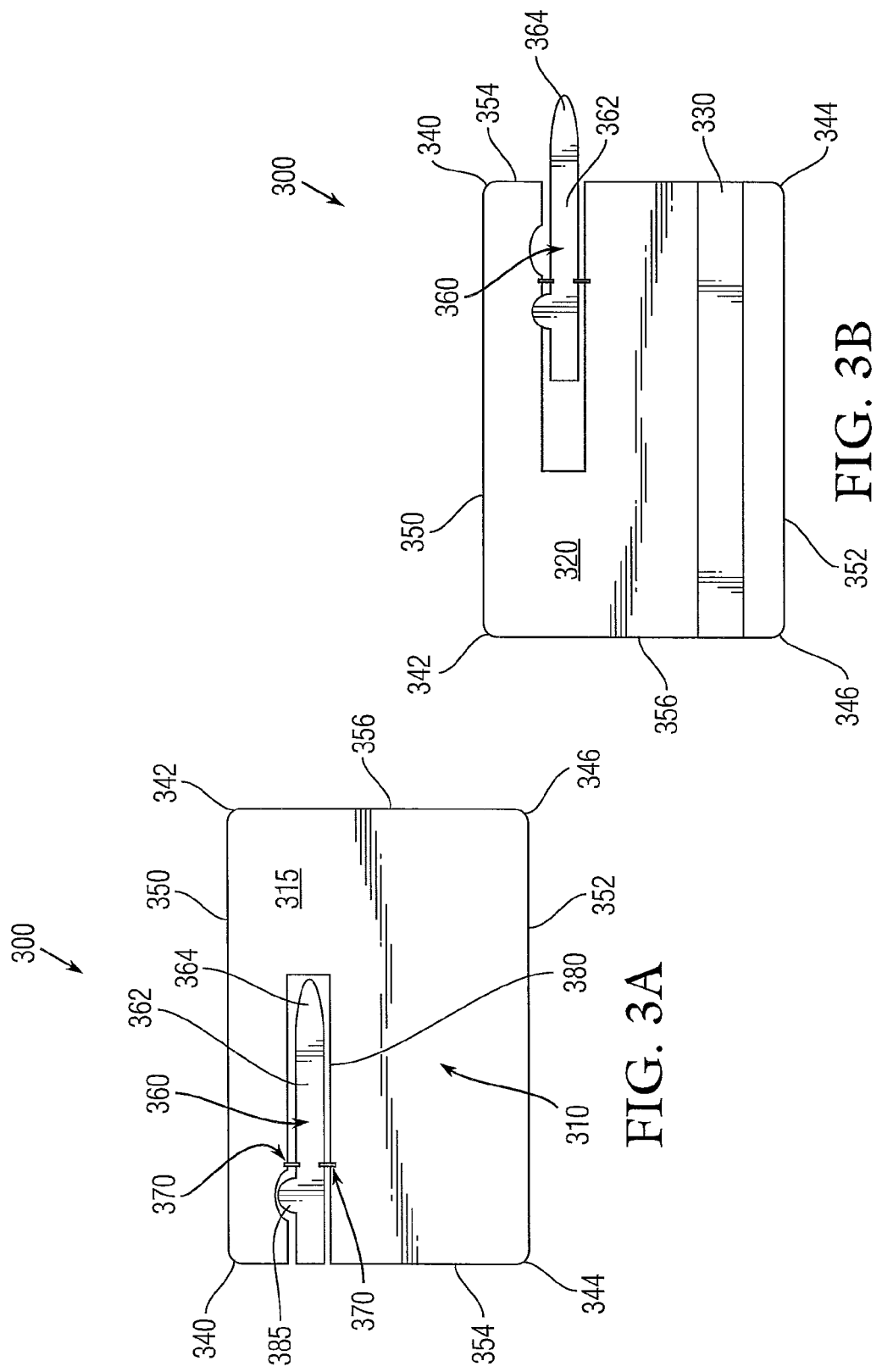

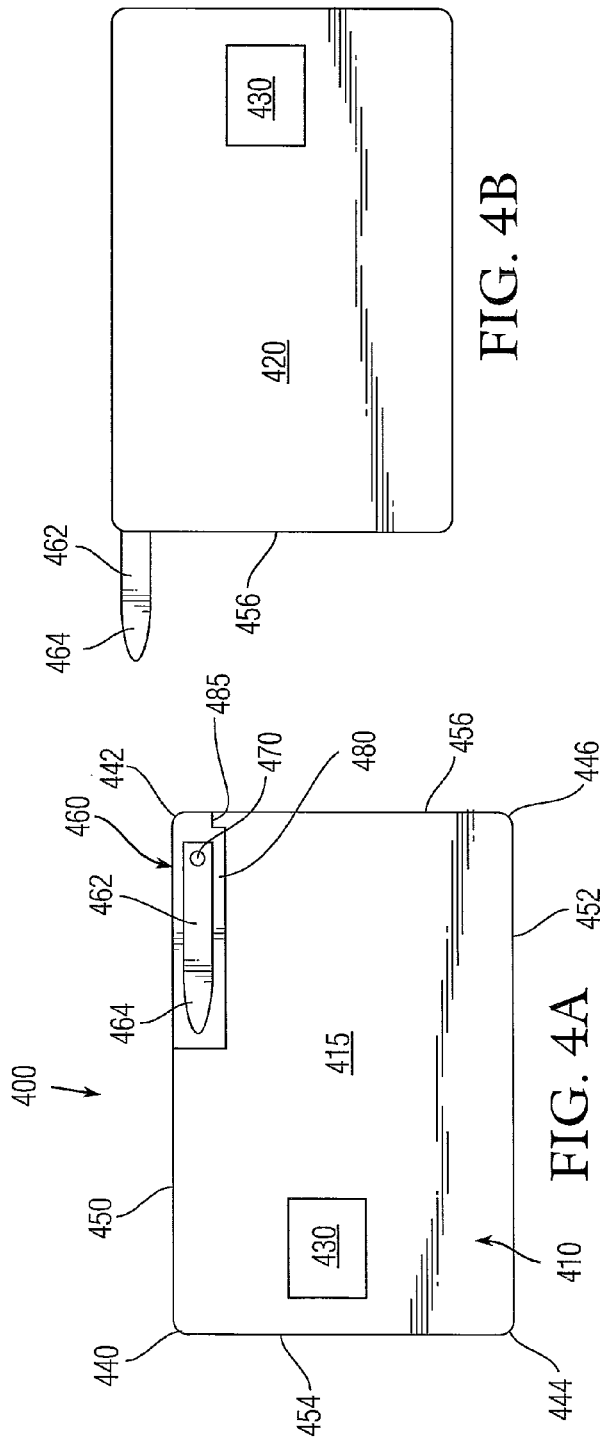
FIG. 4B
FIG. 4A
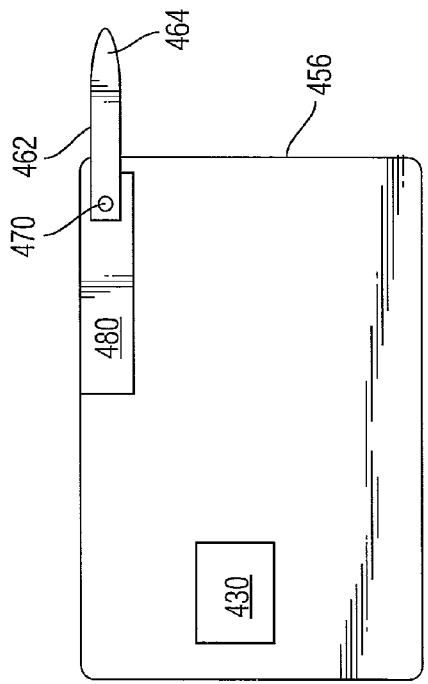
FIG. 4C

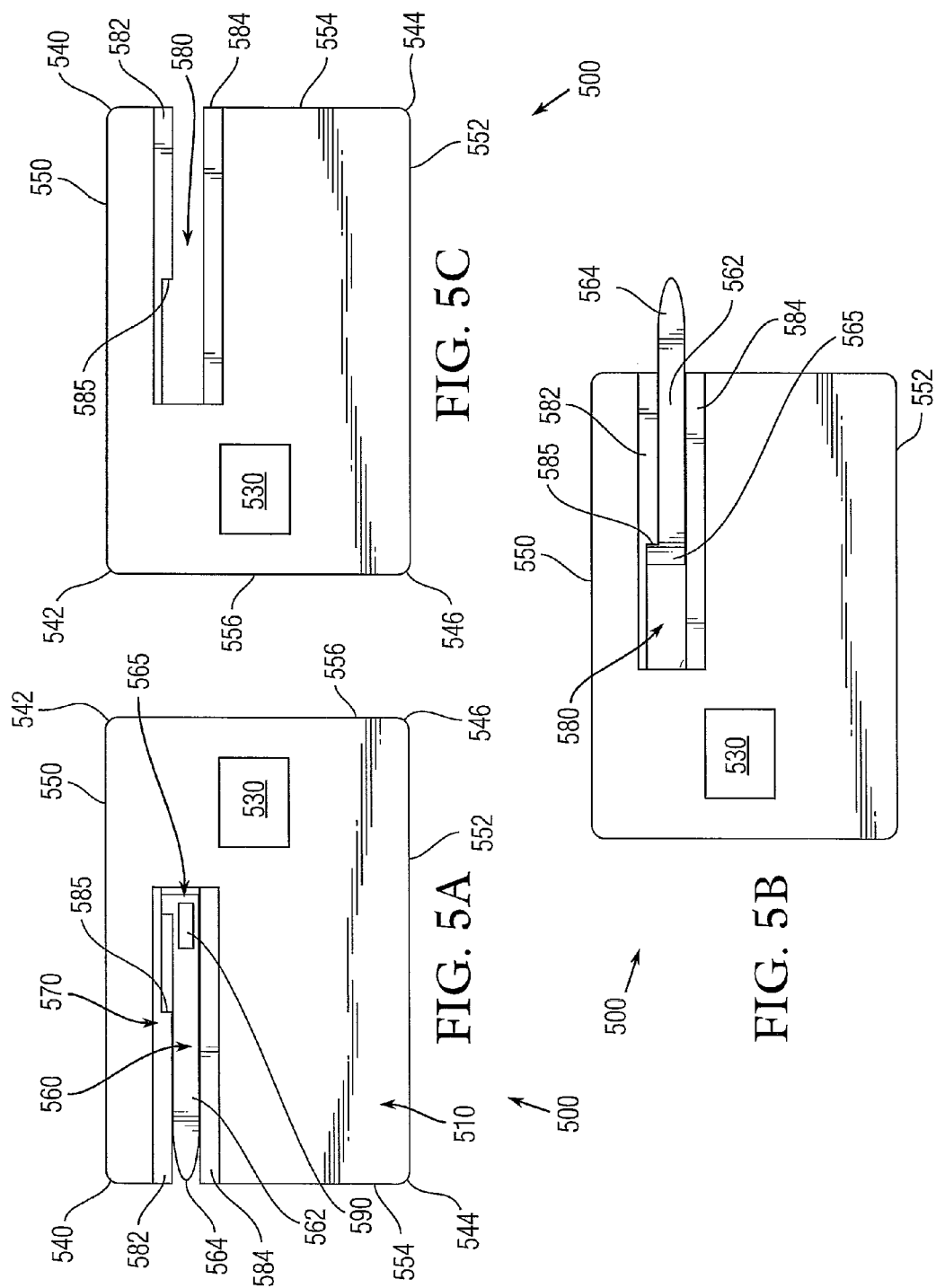

ELECTRONIC TRANSACTION CARD WITH STYLUS

TECHNICAL FIELD OF THE INVENTION

This invention relates to electronic transaction cards, and, in particular, to debit or credit card constructions.

BACKGROUND OF THE INVENTION

Many individuals carry transaction cards such as credit cards, debit cards, pre-paid cards and the like to complete daily purchases. Generally, completing a credit card or prepaid card transaction requires the user or merchant to swipe the user's transaction card and also requires the user to provide a signature for security purposes. While the signature portion of the transaction is traditionally completed using a pen on a printed receipt, more modern transaction processing systems implement electronic touchscreens and provide a stylus for a user to sign the touchscreen such that a digital copy of the signature is automatically saved to the transaction processing system. Similarly, completing a debit transaction often requires a user to input a pin number on a touch screen reader with a stylus. A stylus, in the context of this application, is a computer accessory that can assist a user in providing more precise interaction with a touchscreen than can be had by using a finger. As such, styli are generally shaped like writing utensils so that they can be grasped by a user. Furthermore, the tip of a stylus comes to a point, much like a pen or pencil, to provide precision interaction with the touchscreen. However, the tip of a stylus is rounded so as not to damage (e.g. scratch) the screen or inadvertently puncture a user's skin if mishandled. The tip of the stylus is generally made from a material such as plastic that has a low coefficient of friction so as to easily slide when in contact with the touchscreen. The touchscreen is configured to detect the interaction of the point of the stylus with the touchscreen.

Because the stylus of a transaction processing system is used by numerous individuals throughout the course of a day the stylus can become quite dirty, harbor bacteria and is generally unsanitary. While purchasing and carrying around a personal stylus is possible to avoid having to touch and use a "public" stylus of a transaction processing system, carrying yet another accessory is inconvenient. Although the corners of currently available credit and debit cards can be used to interact with a touch screen, they are not suitable for this application because the radius of curvature of a corner is too large to provide precise interaction with the touchscreen as required when providing a signature.

Therefore, it would be beneficial to have a credit/debit card with an integrated stylus that is specially adapted to be easily and effectively used in a sanitary manner and does not require the user to carry any additional accessories.

These considerations are addressed by the present invention.

SUMMARY OF THE INVENTION

The present invention concerns in a broad aspect a transaction card with an integrated stylus that can be used with touchscreen readers in transaction processing systems. The transaction card comprises: a base constructed from a substantially rectangular material having a front and back face defining a first thickness therebetween, and at least four corners; at least one of the corners has a shape defining a stylus tip and differs from the other corners; and an electronic storage medium bearing information presentable to consummate a financial transaction.

According to another aspect, a transaction card with an integrated stylus is provided, the transaction card includes: a base constructed from a substantially rectangular material having a first and second face forming at least a first thickness; an electronic storage medium bearing information presentable to consummate a financial transaction; a stylus having a stylus arm and tip disposed within the stylus housing and in communication with an actuating member; and a mount configured to support the stylus in a first position in which the stylus is contained within a line defined by two corners of the base and a second position in which the stylus tip and at least a portion of the stylus arm extend beyond the line defined by two corners of the base.

These and other aspects, features, steps and advantages can be further appreciated from the accompanying figures and description of certain illustrative embodiments.

BRIEF DESCRIPTION OF THE DRAWINGS

FIG. 1A is a front plan view of a transaction card in accordance one embodiment;

FIG. 1B is a back plan view of a transaction card in accordance with the embodiment of FIG. 1A;

FIG. 1C is a perspective view of a transaction card in accordance with the embodiment of FIG. 1A;

FIG. 3A is a front plan view of a transaction card in accordance with a third embodiment;

FIG. 3B is a back plan view of a transaction card in accordance with the embodiment of FIG. 3A;

FIG. 4A is a front plan view of a transaction card in accordance a fourth embodiment showing the stylus in a retracted position;

FIG. 4B is a back plan view of a transaction card in accordance with the embodiment of FIG. 4A now showing the stylus in an extended position;

FIG. 4C is a front plan view of a transaction card in accordance with the embodiment of FIG. 4A also showing the stylus in the extended position;

FIG. 5A is a front plan view of a transaction card in accordance with a fifth embodiment;

FIG. 5B is a back plan view of a transaction card in accordance with the embodiment of FIG. 5A; and FIG. 5C is a back plan view of a transaction card in accordance with the embodiment of FIG. 5A.

DETAILED DESCRIPTION OF THE DRAWINGS

Figure 2:
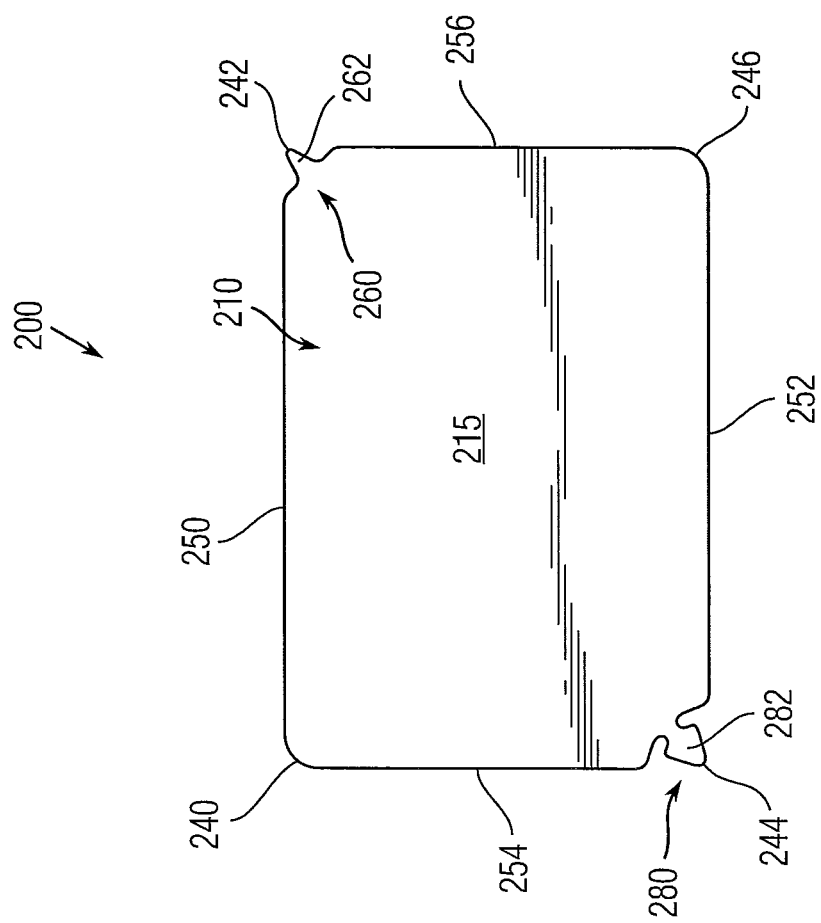
FIG. 2 is a front plan view of a transaction card in accordance with a second embodiment.

Illustrative embodiments of the invention will be described more fully hereinafter with reference to the accompanying drawings, in which some, but not all embodiments of the invention are shown. Indeed, the invention may be embodied in many different forms and should not be construed as being limited to the embodiments set forth herein; rather, these embodiments are provided so that this disclosure will satisfy applicable legal requirements. Like numbers refer to like elements throughout.

By way of overview and introduction, described herein is an electronic transaction card for completing an electronic transaction, such as a credit card or debit card or pre-paid card purchase, and for interacting with the touch screen of the transaction processing system in a sanitary manner. In general, a card is provided with an integrated stylus that can be used to sign or otherwise interact with a touchscreen of the type commonly found in electronic transaction processing systems. In one embodiment, a transaction card is provided that is substantially rectangular and at least one of the corners has a shape that defines a stylus tip that differs from at least one or more of the other corners of the card. In another embodiment a transaction card is provided with an extendible stylus. More particularly, the card includes a mount that supports a stylus that is movable between a stored position, in which the stylus tip does not protrude beyond the edges of the card, and an extended position, in which the stylus tip extends beyond the edge of the card.

FIGS. 1A-1C depict an electronic transaction card 100 according to an exemplary embodiment of the present invention. The card includes a base 110 constructed from a substantially rectangular material having a front face 115 and a back face 120. The thickness between the front face and the back face define a first thickness 125 of the card. The base includes at least four corners, a top left corner 140, a top right corner 142, a bottom left corner 144, and bottom right corner 146. The top left and top right corners are connected by a top side or edge 150. The bottom left and bottom right corner are connected by a bottom side 152. The top left and bottom left corners are connected by a left side or edge 154. The top right and bottom right corners are connected by a right side or edge 156. As depicted in FIG. 1B, also disposed on the face of the card is an electronic storage medium 130, which in this exemplary embodiment is a magnetic strip embedded in the back face of the card. Electronic storage mediums for use with electronic transaction cards are well known in the art, and include by way of example and not limitation, magnetic strips, onboard computer chips, NFC transponders, RFID transponders and the like. As depicted, the electronic storage medium is disposed lengthwise along the back of the card base material, towards the top side 150 and extends between the left side 154 and the right side 156.

The base or substrate can be formed from one or more of a variety of materials including but not limited to polymers such as polyvinyl chloride (PVC), metals, composites and the like, as is understood by persons of ordinary skill in the art.

In this exemplary embodiment, a bottom corner of the card is shaped to define a stylus 160. As discussed above, the exemplary transaction card includes a magnetic strip disposed on the back of the card towards the top side 150 and it is preferable for the stylus to be located on a corner that is opposite the magnetic strip (i.e. 144 or alternatively 146). However, it should be understood that the stylus can be defined on one or more of the corners that are closer to the magnetic strip.

The substrate is shaped near a bottom right corner to define a hook like on edge 154 that extends towards the bottom edge 152 and gradually extends inward from the line that generally defines the left side as shown in FIG. 1, and then transitions to extend back outwards towards the left side to define one edge of the stylus tip 162. The stylus tip extends towards the left side and is defined by a hook-like indentation. The width of the stylus tip converges to form an apex that points outward from the substrate, parallel to the bottom edge. The stylus tip is configured to point in this direction to be conducive to using the stylus to interact with a touch screen when a holding the card lengthwise along the bottom edge, similar to how a common writing instrument is held in a lengthwise fashion. The radius of curvature of the apex of the stylus tip is preferably between 0.25 mm and 3.0 mm, such that the stylus provides sufficient precision when interacting with a touchscreen, however, the radius of curvature is not limited to this range. The thickness of the stylus is consistent with the first thickness of the substrate, however, it should be understood that the thickness of the stylus tip can also converge to form a point, such that the point of the stylus tip is rounded in width and thickness. A rounded stylus tip allows the stylus tip to be moved across a touchscreen without abrading the touchscreen with a sharp edge.

The stylus can be formed from the same material as the card such as PVC, or an alternative material or combination of materials. For example, the stylus arm and the majority of the stylus tip can be made from plastic as is commonly used to make credit cards. In addition, the apex of the stylus tip can be made from a polymer material such as PTFE that has a low coefficient of friction and high self-lubricating characteristics as is understood by persons having ordinary skill in the art.

Although this exemplary embodiment discloses a single corner that is shaped to define a stylus, any number of the four corners can be shaped to define a stylus, either in the same hook shaped configuration as discussed above or in alternative configurations.

FIG. 2 depicts a front plan view of a transaction card 200 according to another exemplary embodiment of the present invention. The card includes a base or substrate 210 constructed from a substantially rectangular material having a front face 215 and a back face 220 (not shown). The front face and the back face define a first thickness of the card therebetween. The base includes at least four corners, a top left corner 240, a top right corner, 242, a bottom left corner 244 and bottom right corner 246. The top left and top right corners are connected by a top side or edge 250. The bottom left and bottom right corner are connected by a bottom side or edge 252. The top left and bottom left corners are connected by a left side or edge 254. The top right and bottom right corners are connected by a right side or edge 256. Also disposed in the base is an electronic storage medium 230, which in this exemplary embodiment is an RFID transmitter.

In this exemplary embodiment, the top side and right side are shaped to have complimentary indentations that define a parabola shaped stylus 260 near the intersection of the two sides. As the top side and right side converge, near their common corner, there is an inflection of each towards the interior of the base and then a reverse inflection transition to extend back outwards to define the stylus tip. The stylus tip extends outwards to the corner while the stylus tip converges to form an apex that points in the direction of the intersection of the lines generally defined by the top and the right sides. The stylus tip is configured to point in this direction as it is conducive to using the stylus to interact with a touch screen while holding the card in a variety of ways thereby accommodating many different writing instrument holding styles. The radius of curvature of the apex of the stylus tip is preferably between 0.25 mm and 3.0 mm, so that the stylus provides sufficient precision when interacting with a touchscreen, however, an apex with a smaller or larger radius can be envisioned. The thickness of the stylus is consistent with the first thickness of the base, however, it should be understood that the thickness of the stylus tip can also converge to form a point, such that the point of the stylus tip is rounded in width and thickness.

In addition, the exemplary card 200 depicted in FIG. 2 also includes a second stylus 280. The bottom side 252 and left side 254 are shaped to have complimentary indentations that define a spade shaped stylus 280 at or near the intersection of the two sides. As the bottom side extends towards the left side, the side has a rounded edge and sharply extends inward towards the interior of the base generally parallel to the left side. The side then has a rounded transition to extend back outwards towards the line generally defined by the majority of the length of the bottom side. The bottom side also gradually extends back towards the right side before transitioning again to extend towards the left side and define the stylus tip. The left side is formed to have a complementary indentation. The stylus tip extends outwards in the direction of the intersection of the lines generally defined by the bottom side and the left side and the width of the stylus tip converges to form an apex. The stylus tip is configured to point in this direction as it is conducive to using the stylus to interact with a touch screen while holding the card in a variety of ways thereby accommodating many different writing instrument holding styles. The radius of curvature of the apex of the stylus tip is preferably between 0.25 mm and 3.0 mm, so that the stylus provides sufficient precision when interacting with a touchscreen, however, an apex with a smaller or larger radius can be envisioned. The thickness of the stylus is consistent with the first thickness of the base, however, it should be understood that the thickness of the stylus tip can also converge to form a point, such that the point of the stylus tip is rounded in width and thickness.

FIGS. 3A-3B depict an electronic transaction card 300 according to yet another embodiment of the present invention. The card includes a base or substrate 310 constructed from a substantially rectangular material having a front face 315 and a back face 320. FIG. 3A is a front plan view of the card 300, showing the front face. FIG. 3B is a back plan view of the card 300, showing the back face. The front face and the back face define a first thickness of the card therebetween. The base includes at least four corners, a top left corner 340, a top right corner, 342, a bottom left corner 344 and bottom right corner 346. The top left and top right corners are connected along a top side or edge 350. The bottom left and bottom right corner are connected along a bottom side or edge 352. The top left and bottom left corners are connected along a left side or edge 354. The top right and bottom right corners are connected along a right side or edge 356. Also disposed in the base is an electronic storage medium 330, which in this exemplary embodiment is a magnetic strip located on the back face of the base.

The electronic transaction card also includes a stylus 360, having a stylus arm 362 and a stylus tip 364. In the exemplary embodiment, the stylus arm is generally rectangular and flat with the same thickness as the card so that the card can be stored in a wallet much like a traditional credit card free of bumps or irregularities in the surface that may be uncomfortable to a user or damage other items in the wallet. Alternatively, the stylus arm can be thicker or thinner than the base. Moreover, the stylus arm can be made in a variety of shapes including but not limited to a cylinder as would be understood by a person of ordinary skill in the art.

The stylus tip extends from the end of the stylus arm. In the exemplary embodiment, the thickness of the tip is consistent with the thickness of the stylus arm and base however, the width of the tip converges to form a point. The radius of curvature of the apex of the tip is preferably between 0.25 mm and 3.0 mm, so that the stylus tip provides sufficient precision when interacting with a touchscreen, however, a smaller or larger radius can be achieved. It should also be understood that the thickness of the stylus tip can also converge to form a point, such that the point of the stylus tip is rounded in width and in thickness.

The stylus can be formed from the same material as the card such as PVC, or an alternative material or combination of materials. For example, the stylus arm and the majority of the stylus tip can be made from plastic as is commonly used to make credit cards such as PVC. In addition, the point of the stylus tip can be made from a different polymer material such as PTFE that has a low coefficient of friction and high self-lubricating characteristics as would be well understood by a person of ordinary skill in the art.

The electronic transaction card also includes a mount. As depicted in FIGS. 3A-3B, the mount can comprise one or more pivots 370 that connect the stylus to the base. In this exemplary embodiment two pivot pins extend from the base into the sides of the stylus arm and rotatably secure the stylus to the base. The pivots are configured to support the stylus for movement between a first and a second position. FIG. 3A depicts a front plan view of the transaction card with the stylus in a first position. In this first position, the stylus is contained within the edge along the line defined by the top left corner and bottom left corner of the base (i.e., the left side 354). FIG. 3B depicts the back plan view of the card with the stylus in the second position. In the second position, the stylus tip and at least a portion of the stylus arm extend beyond left side 354.

In order for the stylus to be movable between the first position and the second position by rotating around the axis of the pivots, the base of the card is shaped to define a cut-out 380 that generally matches the shape of the stylus. In this exemplary embodiment, the cut-out extends from the left side 354 of the base towards the interior of the base, however, it should be understood that the cut-out can extend inward from any side of the base. Preferably, the stylus is mounted to the base within the cut out, such that it is generally flush with the front side and back side when in the first and/or second positions.

The electronic transaction card also includes a mechanical stop that prevents the stylus from moving beyond the second position. In the exemplary embodiment depicted in FIGS. 3A-3B, the mechanical stop is a protrusion 385 that extends from the stylus arm. The shape of the cut-out 380 corresponds to the profile of the stylus when in a first position, so that there is no interference between the protrusion and the base of the card. However, when the stylus is moved from the first position to the second position, as depicted in FIG. 3B, there is interference between the protrusion and the edge of the cut-out preventing the stylus from moving beyond the second position.

Although only one particular mechanical stop configuration is depicted in this exemplary embodiment, the stylus arm and the cut-out can take on a variety of shapes to create interference thereby preventing the stylus from extending beyond the second position, as would be well understood by a person of ordinary skill in the art. It should also be understood that the thickness of the protrusion can also be made smaller to make the stylus generally flush with the base of the card when in a second position. Similarly, the base can also include a depression, with a smaller thickness than the first thickness, where the protrusion contacts the base when in the second position so that the stylus is generally flush with the base of the card when in a second position.

FIGS. 4A-4C depict an electronic transaction card 400 according to yet another embodiment of the present invention. The card includes a base 410 constructed from a substantially rectangular material having a front face 415 and a back face 420. FIG. 3A is a front plan view of the card 400, showing the front face. FIG. 3B is a back plan view of the card 400, showing the back face. The front face and the back face define a first thickness 425 of the card therebetween and also a second thickness 427. The front face is formed to define a depressed region 480 that has a second thickness 427 which is less thick than the first thickness. The depressed region can be a result of a laminating process, a compression step, a milling process and so on. The base includes at least four corners, a top left corner 440, a top right corner, 442, a bottom left corner 444 and bottom right corner 446. The top left and top right corners are connected along a top side or edge 450. The bottom left and bottom right corner are connected along a bottom side or edge 452. The top left and bottom left corners are connected along a left side or edge 454. The top right and bottom right corners are connected along a right side or edge 456. Also disposed in the base is an electronic storage medium 430, which in this exemplary embodiment is a integrated circuit chip embedded within the base.

The electronic transaction card also includes a stylus 460, having a stylus arm 462 and a stylus tip 464. In this exemplary embodiment the stylus arm is rectangular and flat with a thickness that is less than the first thickness of the base. The stylus tip extends from the distal end of the stylus arm. In the exemplary embodiment, the thickness of the tip is consistent with the thickness of the stylus arm however, the width of the tip converges to form a point. The radius of curvature of the apex of the tip is preferably between 0.25 mm and 3.0 mm, so that the stylus tip provides sufficient precision when interacting with a touchscreen, however, a smaller or larger radius can be achieved. It should also be understood that the thickness of the stylus tip can also converge to form a point, such that the point of the stylus tip is rounded in three dimensions.

The stylus can be formed from the same material as the card such as PVC, or an alternative material or combination of materials. For example, the stylus arm and the majority of the stylus tip can be made from plastic as is commonly used to make credit cards. In addition, the point of the stylus tip can be made from a polymer material such as PTFE that has a low coefficient of friction and high self-lubricating characteristics as would be well understood by a person of ordinary skill in the art.

The electronic transaction card also includes a mount 470. As depicted in FIG. 4A, the mount can be one or more pivots that connect the stylus to the base. In this exemplary embodiment a single pivot extends from the base into the proximal end of the stylus arm and rotatably secures the stylus to the base. The pivot is configured to support the stylus in a first and a second position, and allow the stylus to be moved between the two positions. FIG. 4A depicts a front plan view of the transaction card with the stylus in a first position. In this first position, the stylus is contained within the perimeter edge defined along the line defined between the top right corner and bottom right corner of the base (i.e. right side 456). FIGS. 4B and 4C depict the card with the stylus in the second position. In the second position, the stylus tip and at least a portion of the stylus arm extend beyond right side 456.

In order for the stylus to be movable between the first position and the second position by rotating around the axis of the pivot, and to maintain an overall card thickness that is generally consistent, the base of the card is shaped to define a depression 480 that generally matches the shape of the stylus. As described above, the stylus arm is generally flat and has a smaller thickness than the first thickness of the card. Preferably, the thickness of the stylus and the second thickness of the base at the depression, together, approximately equal the first thickness. Accordingly, when the stylus is mounted to the base and in the first position, the front side has a generally even surface so that the card can be stored in a wallet without having any lumps or irregularities that may be uncomfortable to a user or damage other items in the wallet. Alternatively, the stylus arm can be thicker or thinner than the base. Moreover, the stylus arm can be made in a variety of shapes including but not limited to a cylinder, or a semi-cylinder as would be understood by a person of ordinary skill in the art. In this exemplary embodiment, the depression is located in the upper right corner of the base, however, it should be understood that the depression can be located at any corner the base.

The electronic transaction card also includes a mechanical stop 485 that prevents the stylus from moving beyond the second position. In the exemplary embodiment depicted in FIGS. 4A, 4C, the mechanical stop is an extension of the wall of the depression. The shape of the depression 480 corresponds to the profile of the stylus when in a first position, so that there is no interference between the protrusion and the base of the card. However, when the stylus is moved from the first position to the second position, as depicted in FIG. 4C, there is interference between the mechanical stop and the side of the stylus that prevents the stylus from moving beyond the second position.

Although only one particular shape of the stylus and depression and mechanical stop is depicted in this exemplary embodiment, the stylus arm and the depression and mechanical stop can take on a variety of shapes to prevent the stylus from extending beyond the second position, as would be well understood by a person of ordinary skill in the art.

FIGS. 5A-5C depict an electronic transaction card 500 according to yet another embodiment of the present invention. The card includes a base 510 constructed from a substantially rectangular material having a front face 515 and a back face 520. FIG. 5A is a front plan view of the card 500, showing the front face. FIG. 5B is a back plan view of the card 500, showing the back face. FIG. 5C is a back plan view of the card with the stylus removed. The front face and the back face define a first thickness of the card therebetween. The base includes at least four corners, a top left corner 540, a top right corner, 542, a bottom left corner 544 and bottom right corner 546. The top left and top right corners are connected along a top side or edge 550. The bottom left and bottom right corner are connected along a bottom side or edge 552. The top left and bottom left corners are connected along a left side or edge 554. The top right and bottom right corners are connected along a right side or edge 556. Also disposed in the base is an electronic storage medium 530, which in this exemplary embodiment is a embedded computer chip.

The electronic transaction card also includes a stylus 560, having a stylus arm 562 and a stylus tip 564. The stylus tip extends from the distal end of the stylus arm. In this exemplary embodiment, the stylus arm is L shaped and is flat with generally the same first thickness as the card so that the card can be stored in a wallet much like a traditional credit card without creating any lumps or irregularities that may be uncomfortable to a user or damage other cards in the wallet. However, alternatively, the stylus arm can be thicker or thinner than the base. Moreover, the stylus arm can be made in a variety of shapes including but not limited to a cylinder or semi-cylinder as would be understood by a person of ordinary skill in the art. In the exemplary embodiment, the thickness of stylus the tip is consistent with the thickness of the stylus arm and base however, the width of the tip converges to form a point. The radius of curvature of the apex of the tip is preferably between 0.25 mm and 3.0 mm, so that the stylus tip provides sufficient precision when interacting with a touchscreen, however, a smaller or larger radius can be achieved. It should also be understood that the thickness of the stylus tip can also converge to form a point, such that the point of the stylus tip is rounded in three dimensions.

The stylus can be formed from the same material as the card such as PVC, or an alternative material or combination of materials. For example, the stylus arm and the majority of the stylus tip can be made from plastic as is commonly used to make credit cards. In addition, the point of the stylus tip can be made from a polymer material such as PTFE that has a low coefficient of friction and high self-lubricating characteristics as would be well understood by a person of ordinary skill in the art.

The electronic transaction card also includes a mount 570 that connects the stylus to the base and is configured to support the stylus in a first and a second position, and allow the stylus to be moved between the two positions. FIG. 5A depicts a front plan view of the transaction card with the stylus in a first position. In this first position, the stylus is contained within the perimeter defined along the line between the top left corner and bottom left corner of the base (i.e. left side 554). FIG. 5B depicts the back plan view of the card with the stylus in the second position. In the second position, the stylus tip and at least a portion of the stylus arm, extend beyond left side 554.

Referring now to FIG. 5C, which is a back plan view of the card 500 with the stylus removed in order to more clearly depict the mount 570, in order for the stylus to be movable between the first position and the second position along the mount 570, the base of the card is shaped to define a cut out 580 that generally corresponds to the shape of the stylus. In this exemplary embodiment, the cut out extends from the left side 554 of the base towards the interior of the base, however, it should be understood that the cut out can extend inward from any side of the base. Preferably, the stylus is mounted within the cut out, such that it is flush with the front side and back side when in the first and/or second positions and is slide-able between the first and/or second positions.

The mount 570 includes an upper guide rail 582, and a lower guide rail 584, though in other arrangements a single guide rail can be provided. The guide rails are shaped to engage the sides of the stylus. In this exemplary embodiment the guide rails extend from the edges of the cut out and extend into the cut out and are rounded so that they are convex. The sides of the stylus can be concave to matingly engage the guide rails so that the stylus can slide along the guide rails between the first and second positions.

The electronic transaction card can also include a mechanical stop 585 that prevents the stylus from moving beyond the second position. In the exemplary embodiment depicted in FIGS. 5A-5C, the mechanical stop is a wall 585 of the guiderail. The shape of the cut-out 580, and the upper guide rail 582 create a wider empty space towards the interior of the card. Similarly, the stylus is L shaped with a wider proximal end 565. When in the first position, because of the corresponding shapes of the cut out, upper guide rail and stylus, there is no interference between the mechanical stop and the wider, proximal end of the stylus arm. However, when the stylus is moved from the first position to the second position, as depicted in FIG. 5B, there is interference between the wider proximal end of the stylus and the wall 585 of the guiderail preventing the stylus from moving beyond the second position.

Although only one particular mechanical stop configuration is depicted in this exemplary embodiment, the stylus arm and the cut-out can take on a variety of shapes to create interference thereby preventing the stylus from extending beyond the second position, as would be well understood by a person of ordinary skill in the art.

In addition, the surface of the stylus arm can include a grip area 590 that is configured to provide purchase to the user when sliding the stylus between the first and second positions. The grip can include but is not limited to a roughened surface, ribbing or a button like protrusion that a user can grip with a finger tip. While the grip area 590 is shown on the front surface of the stylus, it should be understood that one or more such grip areas can be provided on the front and/or back surface of the stylus.

Any of the foregoing embodiments can include one or more conductive materials to form at least a portion of the base, stylus arm and/or stylus tip thereby enabling the stylus to be used to interact with capacitive touch screen devices.

The exemplary stylus constructions disclosed herein can be included with any known card constructions. Thus, while there have been shown, described, and pointed out fundamental novel features of the invention as applied to several embodiments, it will be understood that various omissions, substitutions, and changes in the form and details of the devices illustrated, and in their operation, may be made by those skilled in the art without departing from the spirit and scope of the invention. Substitutions of elements from one described embodiment to another are also fully intended and contemplated. It is also to be understood that the drawings are not necessarily drawn to scale, but that they are merely conceptual in nature. The invention is defined solely with regard to the claims appended hereto, and equivalents of the recitations therein.

What is claimed is:

1. An electronic transaction card, comprising:
a base constructed from a substantially rectangular material having a first and
second face defining at least a first thickness, wherein the base further defines a cut-out that extends inward from a side of the base that is between two corners of the base;
a mount disposed within the cut-out;
an electronic storage medium bearing information presentable to consummate a financial transaction;
a stylus having a stylus arm and tip disposed within the cut-out and in communication with the mount, wherein the stylus arm has the first thickness and a top and a bottom surfaces of the stylus are flush with the front side and back side of the card, respectively, and wherein the stylus has a shape that generally corresponds to the cut out, and wherein the stylus comprises the same material as the base;
wherein the mount comprises a guide comprising guide rails, wherein the guide rails are convex and wherein the sides of the stylus arm are concave and matingly engage the convex guide rails, and configured to support the stylus in a first position in which the stylus is contained within a line defined by the two corners of the base and a second position in which the stylus tip and a portion of the stylus arm extend beyond the line defined by the two corners of the base while a portion of the stylus arm remains engaged by the me-guide rails and-while the stylus tip is extended for use;
wherein the guide rails guides the stylus in a linearly slideable manner between the first and second positions;
wherein the guide rails extend inwardly from the side of the base in the direction of the linearly sliding motion of the stylus; and
wherein sides of the stylus arm matingly engages the guide rails while in the first and second positions and while sliding linearly between the first and second positions.

2. The electronic transaction card of claim 1,
wherein the cutout extends through the first thickness of the base; and
wherein the entire top and the bottom surfaces of the stylus are flush with the front side and back side of the card, respectively.

3. The electronic transaction card of claim 1, further comprising a mechanical stop to restrict motion of the stylus beyond the second position.

4. The electronic transaction card of claim 1, wherein a surface of the stylus is configured to provide purchase to a user when moving the stylus between the first and second positions.

5. The electronic transaction card of claim 4, wherein the surface of the stylus is roughened.

6. The electronic transaction card of claim 4, wherein the surface has ribs arranged in a direction perpendicular to the direction of travel of the stylus between the first and second positions.

* * * * *